(12) United States Patent
Mueller

(10) Patent No.: US 7,059,553 B2
(45) Date of Patent: Jun. 13, 2006

(54) MANUALLY DRIVABLE APPARATUS FOR COMMINUTING FOODS

(75) Inventor: Michel P. Mueller, Niederwil (CH)

(73) Assignee: Betty Bossi Varlag AG, Zurich (CH)

( * ) Notice: Subject to any disclaimer, the term of this patent is extended or adjusted under 35 U.S.C. 154(b) by 13 days.

(21) Appl. No.: 10/454,676

(22) Filed: Jun. 5, 2003

(65) Prior Publication Data

US 2004/0159727 A1    Aug. 19, 2004

(30) Foreign Application Priority Data

Feb. 19, 2003   (EP)   ................................. 03405099

(51) Int. Cl.
   *B02C 25/00*   (2006.01)
   *A23N 1/02*   (2006.01)
(52) U.S. Cl. .............. 241/199.12; 241/168; 241/169.1; 241/282.1; 241/282.2; 241/292.1
(58) Field of Classification Search ................ 241/168, 241/169.1, 282.1, 292.1, 282.2, 199.12
   See application file for complete search history.

(56) References Cited

U.S. PATENT DOCUMENTS

| | | | |
|---|---|---|---|
| 2,171,112 A * | 8/1939 | Hoffman ...................... | 401/61 |
| 3,784,118 A | 1/1974 | Hurwitz | |
| 4,209,916 A | 7/1980 | Doyel | |
| 5,064,535 A * | 11/1991 | Hsu ........................ | 210/380.1 |
| 5,156,084 A * | 10/1992 | Lin ............................. | 99/495 |
| 5,360,170 A * | 11/1994 | Cartellone ............... | 241/169.1 |
| D395,194 S | 6/1998 | Wong | |
| 6,035,771 A * | 3/2000 | Conran et al. ................ | 99/510 |
| D426,743 S | 6/2000 | Wong | |
| D426,744 S | 6/2000 | Wong | |
| D430,775 S | 9/2000 | Wong | |
| 6,112,923 A * | 9/2000 | Ma ............................ | 215/252 |

(Continued)

FOREIGN PATENT DOCUMENTS

DE    3914372    10/1990

(Continued)

OTHER PUBLICATIONS

European Patent Office Opposition Brief (w/ English translation).

(Continued)

*Primary Examiner*—Derris H. Banks
*Assistant Examiner*—Jason Y. Pahng
(74) *Attorney, Agent, or Firm*—Oblon, Spivak, McClelland, Maier & Neustadt, P.C.

(57) ABSTRACT

A manually drivable apparatus for comminuting foods. The apparatus includes a substantially rotationally symmetrical vessel configured to receive a material to be cut, a substantially rotationally symmetrical removable cover configured to nonrotatably mount on the vessel, a shaft rotatably mounted centrally along an axis of the vessel, and at least one blade mounted to the shaft and projecting approximately at right angles from the shaft. The apparatus includes a cutting edge provided on the at least one blade on each of a first longitudinal edge and a second longitudinal edge opposite the first longitudinal edge. The apparatus includes a rotatable drive part configured to drive at least the shaft, and includes a gear arranged in the cover and configured to operatively connect the rotatable drive part to the shaft with a transmission ratio that is greater than 1.

18 Claims, 2 Drawing Sheets

U.S. PATENT DOCUMENTS

| | | |
|---|---|---|
| D433,594 S | 11/2000 | Wong |
| D433,871 S | 11/2000 | Wong |
| 6,251,040 B1 | 6/2001 | Safont et al. |
| 6,467,948 B1 * | 10/2002 | Lawson .................... 366/314 |
| 6,510,785 B1 * | 1/2003 | Margolin ................... 99/495 |
| D480,613 S | 10/2003 | Wong |
| 6,793,168 B1 * | 9/2004 | Pedersen ................. 241/169.1 |
| 2002/0153440 A1 * | 10/2002 | Holcomb et al. ........ 241/169.1 |
| 2003/0141395 A1 * | 7/2003 | Wong et al. ............. 241/169.1 |

FOREIGN PATENT DOCUMENTS

| | | |
|---|---|---|
| GB | 2231774 | 11/1990 |

OTHER PUBLICATIONS

Declaration and Express Gourmet Exhibits (11 Pages).

\* cited by examiner

MANUALLY DRIVABLE APPARATUS FOR COMMINUTING FOODS

FIELD OF THE INVENTION

The invention relates to a manually drivable apparatus for comminuting foods, in particular vegetables.

PRIOR ART

In an Applicant's apparatus of the generic type which is marketed as 'der Häxler', the drive part is in the form of a crank mounted centrally in the cover. The shaft has two blades which project at right angles in opposite directions and which in each case are provided with a cutting edge only at the front edge, so that the crank always has to be turned clockwise. Both are arranged relatively closely above the base, although staggered relative to one another in the direction of the shaft. Although the apparatus has generally proved its worth, it is possible for cut solid material, e.g. onions, to be carried by the blades owing to the constant direction of rotation. This can be counteracted to some extent only by a relatively high speed of the blades, which however, particularly when cutting onions, can easily lead to a satisfactory degree of homogeneity being reached only with a high degree of comminution. The apparatus can be used conveniently only if it is supported on a level work surface, which entails a relatively large space requirement during use.

DE-A-39 14 372 discloses an electrically driven vegetable cutter of otherwise similar design, in which the shaft likewise has two blades which project at right angles in opposite directions and are staggered relative to one another in the direction of the shaft. In order to ensure that the carrying of the cut material, which also occurs here, does not have a disadvantageous effect, a counter-knife which is stationary or rotatable only to a limited extent is arranged in the vessel, between said blades. The blades are provided with cutting edges on both longitudinal edges, but this only has the purpose of making it possible to dispense with a startup lock for the electric motor. Controlled reversal of the direction of rotation of the shaft is not envisaged.

Another generic type of apparatuses for comminuting foods, as used in particular for comminuting onions, is evident from EP-A-1 232 840. This apparatus has a knife with a cutting edge which is curved in a serpentine manner on the underside and is mounted at the lower end of a ram which carries an actuating button at its upper end. By impacts on the latter, the knife is caused repeatedly to strike a firm substrate on which the material to be cut lies, against the restoring force of a coil spring. These apparatuses are relatively inconvenient to operate, and moreover pieces of the material to be cut can easily become jammed in the knife, which prevents further comminution of said pieces.

SUMMARY OF THE INVENTION

It is the object of the invention to provide an apparatus of the generic type which ensures high uniformity of the cut material even with a moderate degree of comminution, in particular when cutting onions. Moreover, it should be convenient to operate.

This object is achieved by the features in the characterizing clause of claim 1. The apparatus according to the invention can be held in the hands during use and the shaft which carries the blades can be caused to execute alternately opposite rotational movements by movement of the drive part back and forth relative to the other parts of the apparatus. The spatial position of the apparatus may vary, it generally being tilted by about 90°. In any case, the apparatus is usually not supported during use and therefore requires no free space on a work surface.

In particular, however, it has been found that the material to be cut, in particular onions, is very rapidly and uniformly comminuted. A further advantage of the apparatus is that it is equally convenient to operate for right-handed persons and left-handed persons.

BRIEF DESCRIPTION OF THE DRAWINGS

The invention is explained in more detail below with reference to figures which show only an embodiment.

DESCRIPTION OF THE PREFERRED EMBODIMENTS

Figure 1:
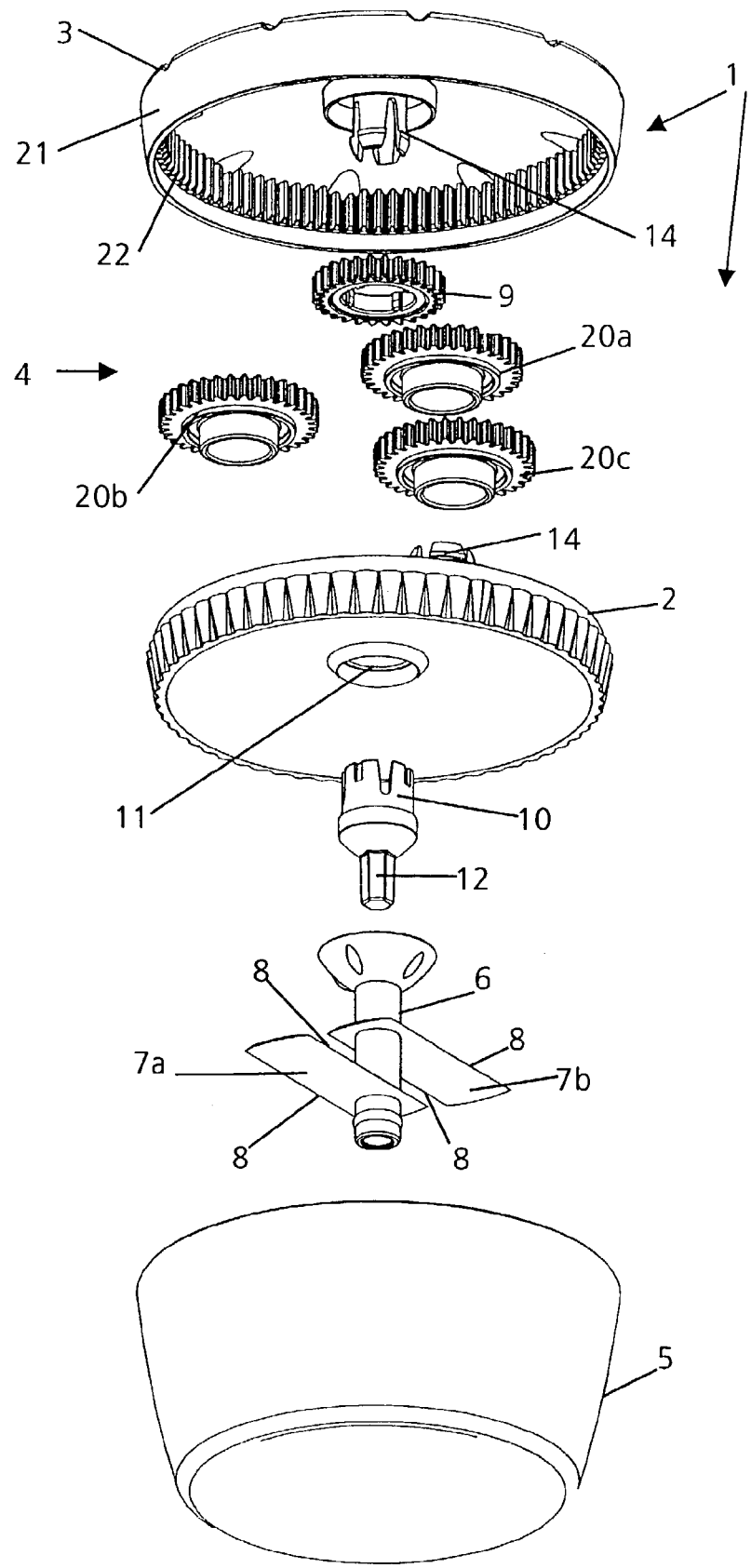
FIG. 1 shows an exploded view of the apparatus according to the invention.
Figure 2:
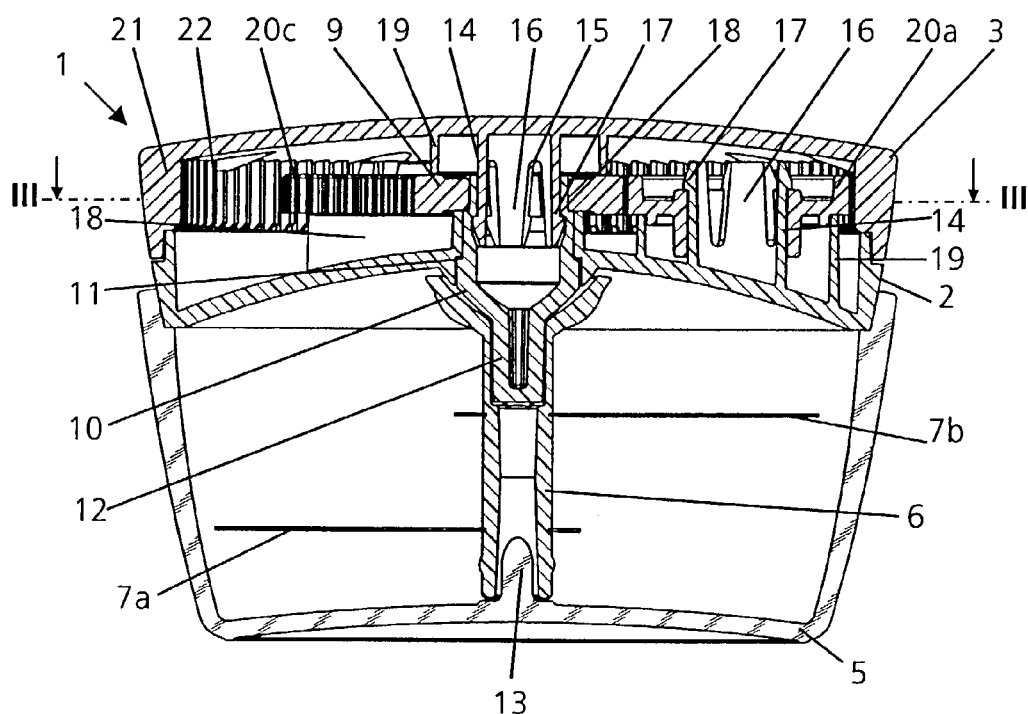
FIG. 2 shows an axial longitudinal section through the apparatus according to the invention of FIG. 1
Figure 3:
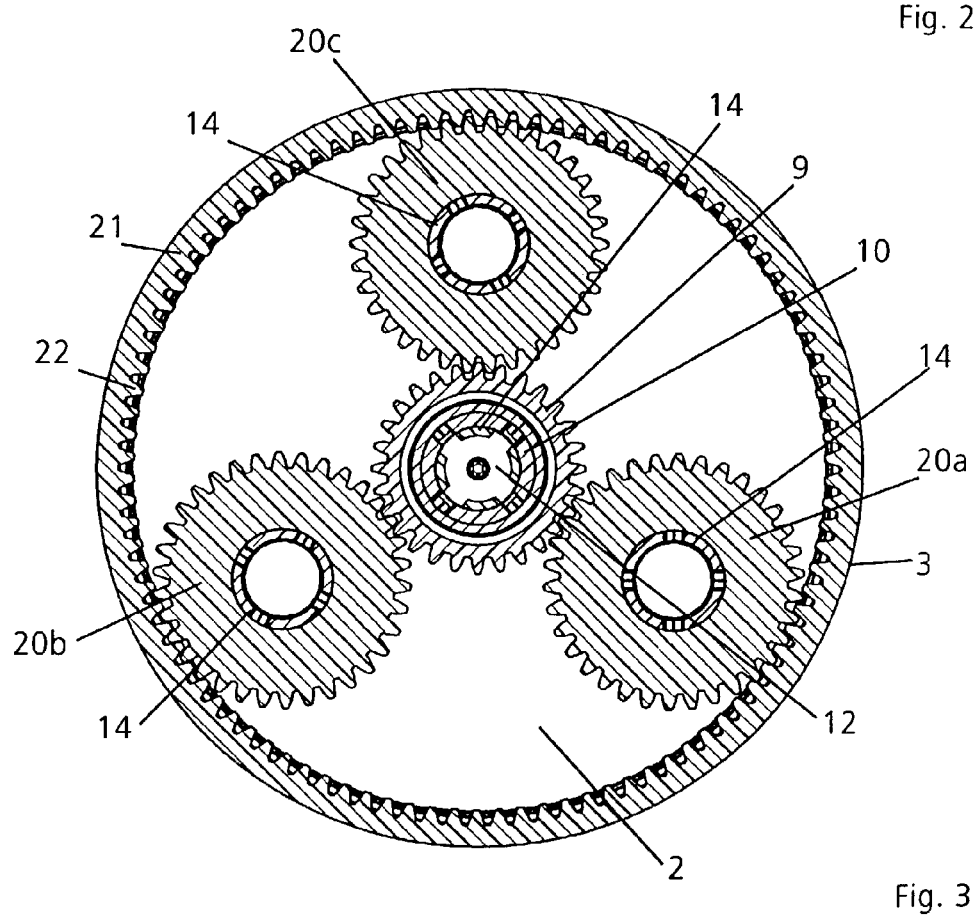
FIG. 3 shows a cross-section along III—III in FIG. 2.

The substantially rotationally symmetrical apparatus has a round cover 1 which comprises a base 2 and a cap 3 as drive part, between which a gear 4 is arranged. The cap 3 has a plurality of indentations distributed at regular intervals over its edge. A beaker- or dish-like vessel 5 of transparent material can be connected to the underside of the base 2 in such a way that a toothed system on the outer edge of the underside of the base 2 engages a complementary tooth system on the inside of the upper edge of the vessel 5 so that the two parts are nonrotatably connected.

Located along the axis of the vessel 5 is a hollow shaft 6 which has an operative connection through the base 2 to the gear 4 on which the cap 3 acts on the other side so that rotations thereof relative to the base 2 are converted into rotations of the shaft 6. The latter carries two approximately rectangular blades 7a, 7b which project approximately at right angles on opposite sides and are oriented perpendicular to the axis and extend up to close to the wall of the vessel 5. The blades 7a,b are staggered relative to one another in the direction of the axis in such a way that the axial distance from the lower blade 7a to the base approximately corresponds to the axial distance from the upper blade 7b to the edge of the vessel 5, while the distance between the two blades 7a, 7b is slightly larger. Each of the blades 7a,b has a cutting edge 8 in each case on two parallel longitudinal edges.

The gear 4 comprises a plurality of gear wheels lying in a plane and mounted so as to be rotatable in the cover. A central wheel 9 located in the centre of the cover 1 has a central orifice which is nonrotatably engaged by a sleeve 10 which projects through a central orifice 11 in the base 2 into the interior of the vessel 5. There, it carries at its lower end a peg 12 which has a hexagonal cross-section and engages a corresponding recess in the upper end of the shaft 6 so that the sleeve 10 and, via this, the central wheel 9 are nonrotatably connected to the shaft 6. At the lower end, the shaft 6 is mounted on the base of the vessel 5 by virtue of the fact that a bearing journal 12 formed there projects into it. At its upper end, where it widens in a dish-like manner and surrounds the lower part of the sleeve 10, it extends up to the base 2 so that penetration of cut material between the sleeve 10 and the shaft 6 is not possible.

The sleeve 10 is mounted on a hollow axle journal 14 which projects downwards from the centre of the cap 3 and engages an orifice in the sleeve 10, which orifice is concentric with the central wheel 9. It has a plurality of fingers 16 which are separated by slots 15 and carry at their ends hooks 17 which grip behind an all-round ledge 18 in the interior of the sleeve 10 and thus limit its axial displaceability in a downward direction. The latter is at the same time limited in an upward direction by a stop ring 19 on the cap 3, which stop ring surrounds the axle journal 14 at a distance, so that the sleeve 10 has only slight axial play.

The central wheel 9 is surrounded concentrically by three identical intermediate wheels 20a,b,c which engage it at points uniformly distributed over its circumference. They are mounted similarly to the sleeve 10 on axle journals 14 which in this case project upwards from the base 2 but are otherwise formed correspondingly and engage concentric orifices, and once again are limited in their axial displaceability by hooks 17 and stop rings 19 surrounding the axle journals 14 at a distance, so that they too have only slight axial play.

The cap 3 carries, on the inside of a skirt 21 running around its edge and projecting downwards, a gear ring 22 which engages the intermediate wheels 20a,b,c from the outside. A rotation of the cap 3 relative to the base 2 therefore results, via the gear ring 22, in identical rotational movements of the intermediate wheels 20a,b,c, which in turn cause the central wheel 9 to rotate, which rotation is transmitted via the sleeve 10 to the shaft 6. The transmission ratio is preferably from 1:3 to 1:5. In the apparatus shown here, it is 1:4.

The blades 7a,b are produced from stainless strip steel, their surface is electrolytically polished and the cutting edges 8 are sharpened burr-free. All other parts of the apparatus consist of plastic, preferably the cap 3 of ABS, the vessel 5 of SAN and the other parts of POM. They are produced by the injection moulding process.

The dimensions of the apparatus correspond to its intended use as a manually operated apparatus. The diameter is about 108 mm and the height about 75 mm. The length of the blades 7a,b is 52 mm. Of course, deviations from these values are possible. Diameters of from 80 mm to 120 mm and heights of from 60 mm to 120 mm are readily possible without the handling and operating properties of the apparatus being substantially impaired. In the case of a greater height of the vessel, it may be necessary to provide more than two blades axially staggered relative to one another.

The material to be cut—e.g. an onion cut beforehand into quarters—is introduced into the vessel 5, and the cover 1 is then mounted. The vessel 5 is then gripped, for example with the left hand, and the cap 3 with the right hand, its indentations improving its grip, and the apparatus is tilted by about 90° so that its axis is approximately horizontal. The vessel 5 and the base 2 of the cover 1 which is nonrotatably connected to it, on the one hand, and the cap 3, on the other hand, are rotated relative to one another, for example 10 times in alternately opposite directions of rotation, each time by about one full revolution. After about 20 to 30 seconds or 40 to 60 revolutions, which corresponds to 160 to 240 revolutions of the shaft 6 relative to the shaft 5, the onion has been comminuted. The vessel 5 can then be removed and emptied.

Owing to the regular reversal of the direction of rotation, there is virtually no carrying of the cut material by the blades. The generally tilted position of the apparatus during the use thereof leads to a better distribution of the cut material in the vessel 5 and to more uniform processing thereof by the blades 7a,b.

LIST OF REFERENCE SYMBOLS

1 Cover
2 Base
3 Cap
4 Gear
5 Vessel
6 Shaft
7a,b Blades
8 Cutting edges
9 Central wheel
10 Sleeve
11 Orifice
12 Peg
13 Bearing journal
14 Axle journal
15 Slot
16 Finger
17 Hook
18 Ledge
19 Stop ring
20a,b,c Intermediate wheels
21 Skirt
22 Gear ring

The invention claimed is:

1. A manually drivable apparatus for comminuting foods, comprising
a substantially rotationally symmetrical vessel configured to receive a material to be cut;
a substantially rotationally symmetrical removable cover configured to nonrotatably mount on the vessel having,
a base configured to nonrotatably mount on the vessel and having a peripheral rim, and
a rotatable cap covering the base, the cap being rotatable about a central axis of the vessel and having an outer circumference of a size substantially equal to the peripheral rim of the base or the outside circumference of the vessel;
a shaft rotatably mounted along the central axis of the vessel;
at least one blade mounted to the shaft and projecting approximately at a right angle from the shaft;
a cutting edge provided on said at least one blade on each of a first longitudinal edge and a second longitudinal edge opposite the first longitudinal edge,
a rotatable drive part connected to the rotatable cap and configured to drive at least the shaft; and
a gear arranged in the cover and configured to operatively connect the rotatable drive part to the shaft with a transmission ratio that is greater than 1.

2. The apparatus of claim 1, wherein the transmission ratio of the gear ranges is between 3:1 to 5:1.

3. The apparatus of claim 1, wherein:
the gear comprises gear wheels including a central wheel connected concentrically and nonrotatably to the shaft and at least one intermediate wheel;
said at least one intermediate wheel engaging the central wheel;
the central wheel rotatably mounted to the cover; and
the drive part comprises a gear ring that is concentric with the central wheel and that engages the at least one intermediate wheel.

4. The apparatus of claim 3, wherein the gear wheels comprise a plurality of identical intermediate wheels that concentrically surround the central wheel.

5. The apparatus of claim 4, wherein the plurality of intermediate wheels comprises three of said gear wheels.

6. The apparatus of claim 3, further comprising:
hollow axle journals included in the removable cover and having a plurality of fingers and axial slots, said journals divided into the plurality of fingers by the axial slots,
wherein the gear wheels are each mounted on the hollow axle journals of the cover, and said journals engage orifices concentric with the gear wheels.

7. The apparatus of claim 6, further comprising:
projecting hooks at the ends of the fingers,
wherein an axial displaceability of the gear wheels is limited in each case on one side by the projecting hooks.

8. The apparatus of claim 3, further comprising:
a peg connected to the central wheel through a central orifice on that side of the cover which faces the vessel,
wherein the shaft is configured to removably and nonrotatably engage the peg.

9. The apparatus of claim 1, wherein the shaft is configured to engage with the bottom of the vessel.

10. The apparatus of claim 1, wherein the at least one blade comprises:
two blades mounted on opposite sides of the shaft and staggered relative to one another in the longitudinal direction.

11. The apparatus of claim 10, wherein the at least one blade comprises:
a first blade and a second blade, said first blade being approximately the same distance away from an upper edge of the vessel as the second blade is from a base of the vessel.

12. The apparatus of claim 1, further comprising:
a first tooth system on an edge of the vessel,
wherein the cover comprises second tooth system that is configured to engage the first tooth system.

13. The apparatus of claim 1, wherein the cap comprises, on an edge of the cap, a plurality of indentations distributed over a circumference of the cap for improving a grip to the cap.

14. The apparatus of claim 1, wherein the vessel comprises a transparent material.

15. The apparatus of claim 1, wherein at least one of the vessel, the cover, the shaft, the drive part, and the gear comprises a plastic part.

16. The apparatus of claim 15, further comprising:
a non-plastic blade.

17. The apparatus of claim 1, wherein the vessel has a diameter from 80 mm to 120 mm.

18. The apparatus of claim 1, wherein the vessel has a height from 60 mm to 120 mm.

* * * * *